United States Patent
Zhang (10) Patent No.: US 10,719,104 B2
(45) Date of Patent: Jul. 21, 2020

(54) INTELLIGENT TERMINAL AND CONTROL METHOD THEREOF

(71) Applicant: SHENZHEN ROYOLE TECHNOLOGIES CO. LTD., Shenzhen, Guangdong (CN)

(72) Inventor: Xuan Zhang, Guangdong (CN)

(73) Assignee: SHENZHEN ROYOLE TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/313,955

(22) PCT Filed: Dec. 29, 2016

(86) PCT No.: PCT/CN2016/112980
§ 371 (c)(1),
(2) Date: Dec. 28, 2018

(87) PCT Pub. No.: WO2018/119862
PCT Pub. Date: Jul. 5, 2018

(65) Prior Publication Data
US 2019/0235578 A1    Aug. 1, 2019

(51) Int. Cl.
*G06F 1/16*    (2006.01)
*G06F 3/14*    (2006.01)
(Continued)

(52) U.S. Cl.
CPC ............ *G06F 1/1652* (2013.01); *G06F 3/01* (2013.01); *G06F 3/0346* (2013.01);
(Continued)

(58) Field of Classification Search
CPC .......... G06F 1/163; G06F 1/1652; G06F 3/01; G06F 3/0346; G06F 3/0481; G06F 3/0484; G06F 3/0487; G06F 3/14
See application file for complete search history.

(56) References Cited

U.S. PATENT DOCUMENTS

| 2006/0061555 A1* | 3/2006 | Mullen ................. G06F 1/1624 345/169 |
| 2014/0104244 A1* | 4/2014 | Baldwin ............... G06F 1/1626 345/204 |

(Continued)

FOREIGN PATENT DOCUMENTS

| CN | 104539764 A | 4/2015 |
| CN | 105518767 A | 4/2016 |
| CN | 105677149 A | 6/2016 |

OTHER PUBLICATIONS

Wang eta. ,Translation of CN 104539764, Apr. 22, 2015 (Year: 2015).*

(Continued)

*Primary Examiner* — Dmitriy Bolotin
(74) *Attorney, Agent, or Firm* — Hauptman Ham, LLP (57) ABSTRACT

An intelligent terminal is provided, which includes a terminal body, a flexible screen mounted on the terminal body, a screen switching assembly, and a controller. The controller is configured to control retracting or expanding of the flexible screen with the screen switching assembly according to a scenario in which the intelligent terminal is currently located. The present disclosure further provides a method for controlling the intelligent terminal.

19 Claims, 4 Drawing Sheets

(51) Int. Cl.
*G06F 3/0487* (2013.01)
*G06F 3/0484* (2013.01)
*G06F 3/01* (2006.01)
*G06F 3/0346* (2013.01)
*G06F 3/0481* (2013.01)

(52) U.S. Cl.
CPC .......... *G06F 3/0481* (2013.01); *G06F 3/0484* (2013.01); *G06F 3/0487* (2013.01); *G06F 3/14* (2013.01); *G06F 1/163* (2013.01)

(56) References Cited

U.S. PATENT DOCUMENTS

| | | | | |
|---|---|---|---|---|
| 2014/0320396 | A1* | 10/2014 | Modarres | G06F 3/016 345/156 |
| 2017/0061932 | A1* | 3/2017 | Kwon | G06F 1/1626 |
| 2017/0091340 | A1* | 3/2017 | Yoon | G06F 1/1652 |
| 2017/0280570 | A1* | 9/2017 | Li | H05K 5/0017 |
| 2017/0318688 | A1* | 11/2017 | Kim | G06F 1/1652 |
| 2018/0284964 | A1* | 10/2018 | Kang | G06F 3/0488 |
| 2019/0146558 | A1* | 5/2019 | Ohata | G06F 3/147 |

OTHER PUBLICATIONS

International search report dated Oct. 12, 2017 from corresponding application No. PCT/CN2016/112980.

\* cited by examiner

INTELLIGENT TERMINAL AND CONTROL METHOD THEREOF

RELATED APPLICATION

The present application is a National Phase of International Application Number PCT/CN2016/112980, filed Dec. 29, 2016.

TECHNICAL FIELD

This disclosure relates to the technical field of intelligent terminals, and more particularly to an intelligent terminal and a method for controlling the intelligent terminal.

BACKGROUND

Intelligent terminals such as mobile phones, watches, tablets, head-mounted displays, and vehicle navigations are widely used. When the intelligent terminal is a watch, the intelligent terminal can achieve other functions. For example, the intelligent terminal can be used as a pedometer, a pulse monitor, a Bluetooth device, and even a mobile phone. However, a screen of the existing watch has a fixed size and cannot adapt to application requirements of various occasions.

SUMMARY

Embodiments of the present disclosure provide an intelligent terminal and a method for controlling the intelligent terminal, so as to determine a scenario where a user is located and to control the intelligent terminal to automatically adjust the size of a screen of the intelligent terminal.

According to a first aspect of the disclosure, an intelligent terminal is provided. The intelligent terminal includes a flexible screen, a screen switching assembly, and a controller. The controller is configured to control retracting or expanding of the flexible screen the screen switching assembly according to a scenario in which the intelligent terminal is currently located.

As an implementation of the present disclosure, the intelligent terminal further includes a sensor. The controller is configured to determine the scenario in which the intelligent terminal is currently located according to sensing data of the sensor, and the controller is further configured to control the retracting or expanding of the flexible screen with the screen switching assembly according to the scenario in which the intelligent terminal is currently located and a screen switching condition.

As an implementation of the present disclosure, the screen switching condition includes a correspondence relationship between scenarios and statuses of the flexible screen, which is preset by a user in the intelligent terminal.

As an implementation of the present disclosure, the screen switching condition includes a correspondence relationship, built in the intelligent terminal, between scenarios and statuses of the flexible screen.

As an implementation of the present disclosure, the screen switching condition includes one of a correspondence relationship between operation records of a user and statuses of the flexible screen, and a correspondence relationship between operation habits of the user and the statuses of the flexible screen.

As an implementation of the present disclosure, the screen switching condition includes one of a correspondence relationship between operation records of other users and statuses of the flexible screen, and a correspondence relationship between operation habits of the other users and the statuses of the flexible screen.

As an implementation of the present disclosure, the scenario in which the intelligent terminal is currently located includes a system time of the intelligent terminal, and the controller is configured to control the retracting or expanding of the flexible screen the screen switching assembly, according to the system time and a correspondence relationship between preset times and statuses of the flexible screen.

As an implementation of the present disclosure, the controller includes a determining module, which is configured to determine a priority of each of a plurality of screen switching conditions, and the controller is configured to control the retracting or expanding of the flexible screen with the screen switching assembly according to the screen switching condition with the highest priority.

As an implementation of the present disclosure, the plurality of screen switching conditions include a screen switching condition preset by a user and a screen switching condition built in a system of the intelligent terminal, and the screen switching condition preset by the user has a priority higher than that of the screen switching condition built in the system.

As an implementation of the present disclosure, the plurality of screen switching conditions further include a screen switching condition associated with operation records or operation habits of the user, which has a priority lower than that of the screen switching condition preset by the user and higher than that of the screen switching condition built in the system.

As an implementation of the present disclosure, the plurality of screen switching conditions further include a screen switching condition associated with operation records or operation habits of other users, which has a priority lower than that of the screen switching condition associated Ti the operation records or the operation habits of the user and higher than that of the screen switching condition built in the system.

As an implementation of the present disclosure, the controller is further configured to output screen switching prompt information which is selectable to determine whether switch the flexible screen, before the controller controls the retracting or expanding of the flexible screen with the screen switching assembly.

As an implementation of the present disclosure, the controller is further configured to switch the retracting or expanding of the flexible screen, when no operation instruction is received within a preset period in which the screen switching prompt information is outputted.

As an implementation of the present disclosure, the controller is further configured to stop switching the states (retracting or expanding) of the flexible screen, when an operation instruction is received within a preset period in which the screen switching prompt information is outputted.

As an implementation of the present disclosure, the flexible screen includes a flexible screen body, a first half casing, and a second half casing. The first half casing is provided with a spool, the flexible screen body has an end wound on the spool and has another end fixed to the second half casing. The screen switching assembly includes a motor and a rod. The motor is fixed with the first half casing, the rod has a tail end fixed with the second half casing, and the motor is configured to telescope to drive the rod to adjust a distance between the first half casing and the second half casing, to retract or expand the flexible screen body.

According to a second aspect of the disclosure, a method for controlling an intelligent terminal is provided. The method includes the following. A scenario in which the intelligent terminal is currently located is determined. A flexible screen is controlled to retract or expand according to the scenario in which the intelligent terminal is currently located and a screen switching condition.

As an implementation of the present disclosure, the scenario in which the intelligent terminal is currently located is determined as follows. The scenario in which the intelligent terminal is currently located is determined according to sensing data of a location sensor, or sensing data of a location sensor and a motion sensor.

As an implementation of the present disclosure, the flexible screen is controlled to retract or expand according to the scenario in which the intelligent terminal is currently located and the screen switching condition as follows. A screen switching condition preset by a user is obtained. The flexible screen is controlled to retract or expand according to the scenario in which the intelligent terminal is currently located and the screen switching condition preset by the user, when the screen switching condition preset by the user is obtained. A screen switching condition built in a system of the intelligent terminal continues to be obtained, when no screen switching condition preset by the user is obtained, and the flexible screen is controlled to retract or expand according to the scenario in which the intelligent terminal is currently located and the screen switching condition built in the system.

As an implementation of the present disclosure, according to the scenario in which the intelligent terminal is currently located and the screen switching condition, the flexible screen is further controlled to retract or expand as follows. A screen switching condition associated with operation records or operation habits of other users is obtained, prior to obtaining the screen switching condition built in the system, when no screen switching condition preset by the user is obtained. The flexible screen is controlled to retract or expand according to the scenario in which the intelligent terminal is currently located and the screen switching condition associated with the operation records or the operation habits of the other users, when the screen switching condition associated with the operation records or the operation habits of the other users is obtained. The screen switching condition built in the system continues to be obtained when no screen switching condition associated with the operation records or the operation habits of the other users is obtained, and the flexible screen is controlled to retract or expand according to the scenario in which the intelligent terminal is currently located and the screen switching condition built in the system.

As an implementation of the present disclosure, the screen switching condition includes one of a correspondence relationship between operation records or operation habits of a user and statuses of the flexible screen and a correspondence relationship between operation records or operation habits of other users and the statuses of the flexible screen.

As an implementation of the present disclosure, the flexible screen is controlled to retract or expand according to the scenario in which the intelligent terminal is currently located and a screen switching condition as follows. Whether the flexible screen needs to retract or expand is determined according to the scenario in which the intelligent terminal is currently located and the screen switching condition. The flexible screen is controlled to retract or expand.

As an implementation of the present disclosure, the method further includes outputting screen switching prompt information prior to the controlling the flexible screen to retract or expand.

As an implementation of the present disclosure, the method further includes the following. Whether an operation instruction is received within a preset period in which the screen switching prompt information is outputted is determined. Stop switching the retracting or expanding of the flexible screen when an operation instruction is received within the preset period. Switch the retracting or expanding of the flexible screen when no operation instruction is received within the preset period.

According to the intelligent terminal of the present disclosure, the controller is configured to control the retracting or expanding of the flexible screen with the screen switching assembly according to different current scenarios, such that the user can use different functions in different scenarios by switching the screen size appropriately, thereby facilitating the user's use.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description illustrate some embodiments of the present disclosure. Those of ordinary skill in the art may also obtain other drawings based on these accompanying drawings without creative efforts.

DETAILED DESCRIPTION OF ILLUSTRATED EMBODIMENTS

Technical solutions in the embodiments of the present disclosure will be described clearly and completely hereinafter with reference to the accompanying drawings in the embodiments of the present disclosure.

Figure 1:
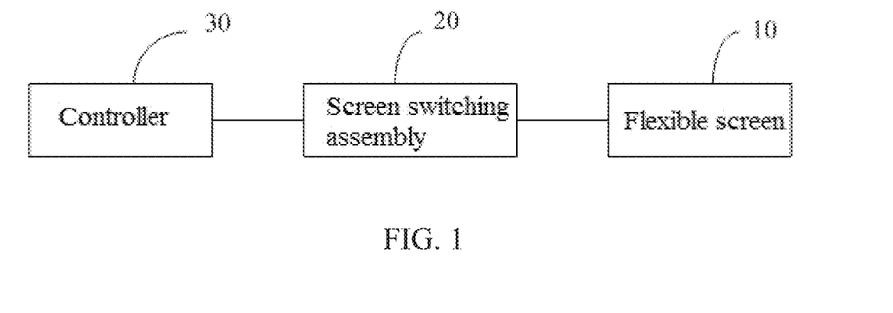
FIG. 1 is a schematic diagram of an intelligent terminal according to an embodiment of the present disclosure.
Figure 2:
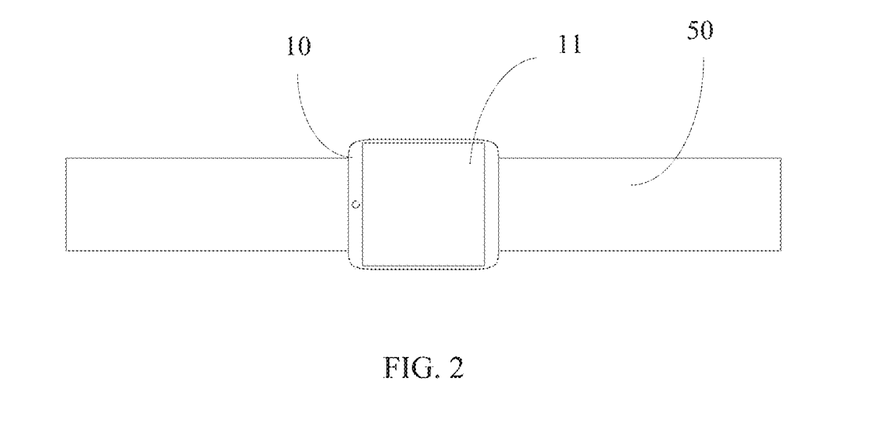
FIG. 2 is a schematic structure view of the intelligent terminal illustrated in FIG. 1.

Referring to FIG. 1 and FIG. 2, the present disclosure provides an intelligent terminal, which includes a flexible screen 10, a screen switching assembly 20, and a controller 30. The controller 30 is configured to control winding or releasing of the flexible screen 10 with the screen switching assembly 20 according to a scenario in which the intelligent terminal is currently located. The following describes a smart watch as an example of the intelligent terminal. The smart watch also includes a watch band 50 on which the flexible screen 10 is mounted. It should be noted that other types of intelligent terminals may also be applied to the present disclosure, such as smart belts, smart phones, tablets, vehicle navigations, and the like.

Figure 3:
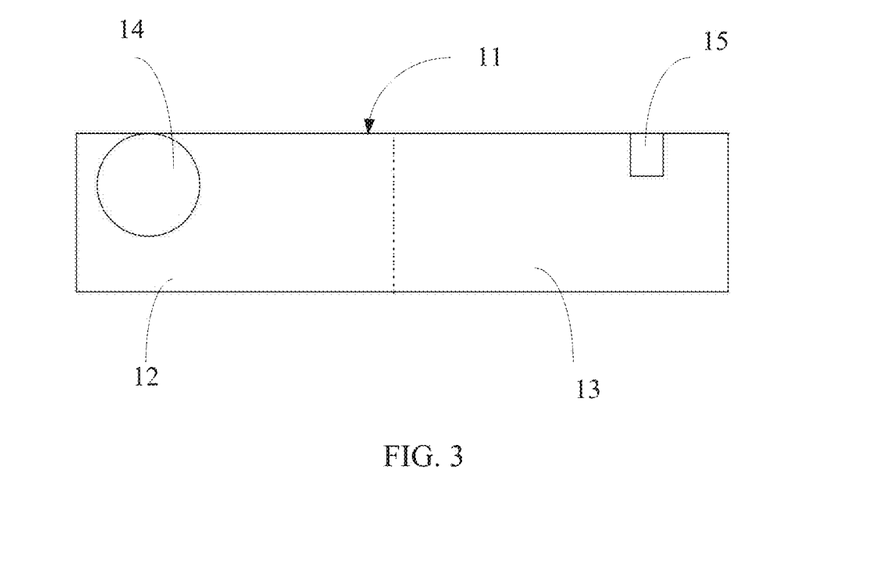
FIG. 3 is a schematic plan view of a flexible screen of the intelligent terminal illustrated in FIG. 2.

Referring to FIG. 3, the flexible screen 10 may include a flexible screen body 11, a first half casing 12, and a second half casing 13. The first half casing 12 and the second half casing 13 cooperatively form a casing of the flexible screen 10. In addition, the casing also includes the controller 30 and a battery received therein. The first half casing 12 is provided with a spool 14, the second half casing 13 is provided with a locking element 15, and the flexible screen body 11 has an end wound on the spool 14 and has another end fixed to the locking element 15.

In the embodiment of the disclosure, the first half casing 12 can be separated from the second half casing 13. When the first half casing 12 and the second half casing 13 are moved away from each other, the flexible screen body 11 is released from the spool 14 to be in a released status. On the other hand, when the first half casing 12 and the second half casing 13 are moved toward each other, a released part of the flexible screen body 11 is re-wound on the spool 14 to be in a retracted status.

Figure 4:
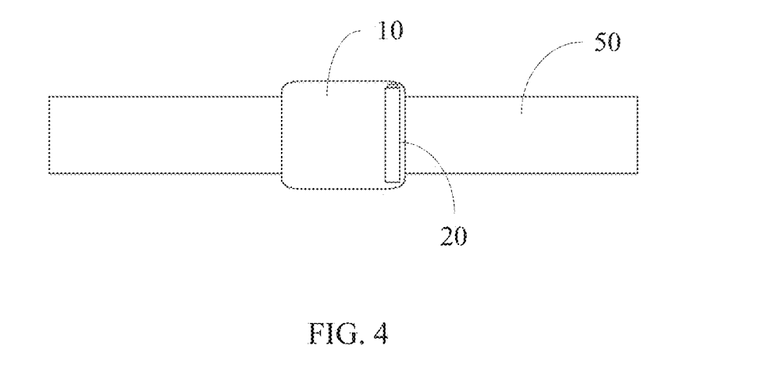
FIG. 4 and FIG. 5 are schematic structure views of a screen switching assembly of the intelligent terminal illustrated in FIG. 1.
Figure 5:
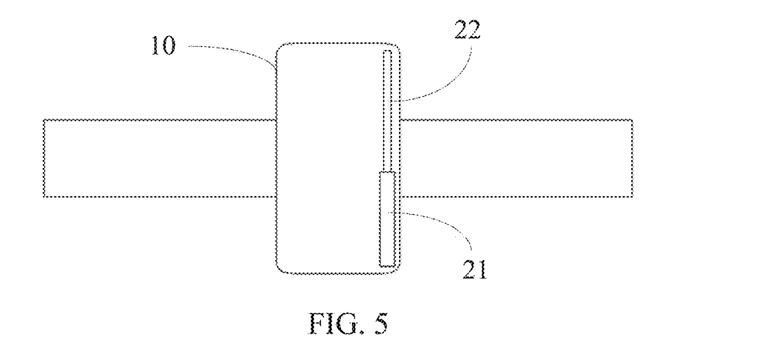

Referring to FIG. 4 and FIG. 5, the screen switching assembly 20 may include a motor 21 and a rod 22. The motor 21 is fixed with the first half casing 12, the rod 22 has a tail end fixed with the second half casing 13, and the motor 21 is configured to telescope to drive the rod 22 to adjust a distance between the first half casing 12 and the second half casing 13. In other embodiments, the screen switching assembly 20 may be a cylinder.

When the controller 30 of the intelligent terminal determines that it is needed to unroll the flexible screen 10 according to a current scenario, the motor 21 is controlled to drive the rod 22 to move outwardly, so as to increase the distance between the first half casing 12 and the second half casing 13, such that the flexible screen body 11 is released from the spool 14 to unroll the flexible screen body 11. In contrary, when the controller 30 determines that it is needed to retract the flexible screen 10 according to the current scenario, the motor 21 is controlled to drive the rod 22 to move back, so as to decrease the distance between the first half casing 12 and the second half casing 13, such that the released part of the flexible screen body 11 can be re-wound on the spool 14 to be in a retracted status.

Figure 7:
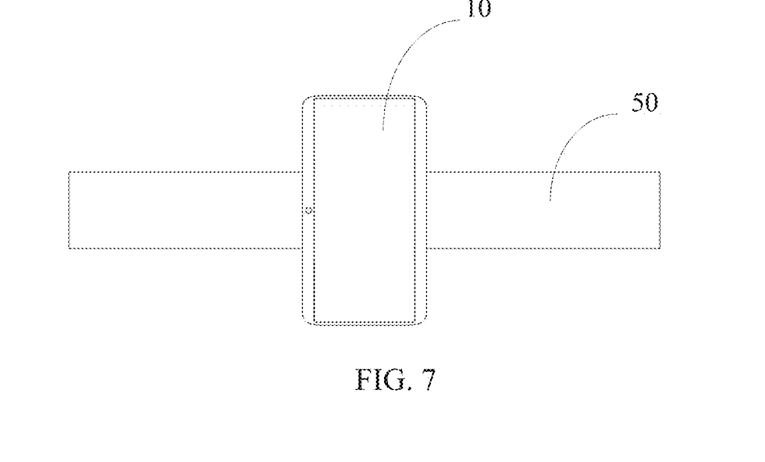
FIG. 7 is a schematic view of an intelligent terminal according to yet another embodiment of the present disclosure.

In a first embodiment of the present disclosure, the scenario in which the intelligent terminal is currently located may include a system time of the intelligent terminal. The controller 30 is configured to control the winding or releasing of the flexible screen 10 with the screen switching assembly 20 according to the system time and a correspondence relationship between preset times and statuses of the flexible screen. For example, as illustrated in FIG. 7, a user can set the intelligent terminal to automatically expand the flexible screen 10 at 8:00 every night to view movie and to automatically retract the flexible screen 10 at 11:00 every night.

Figure 6:
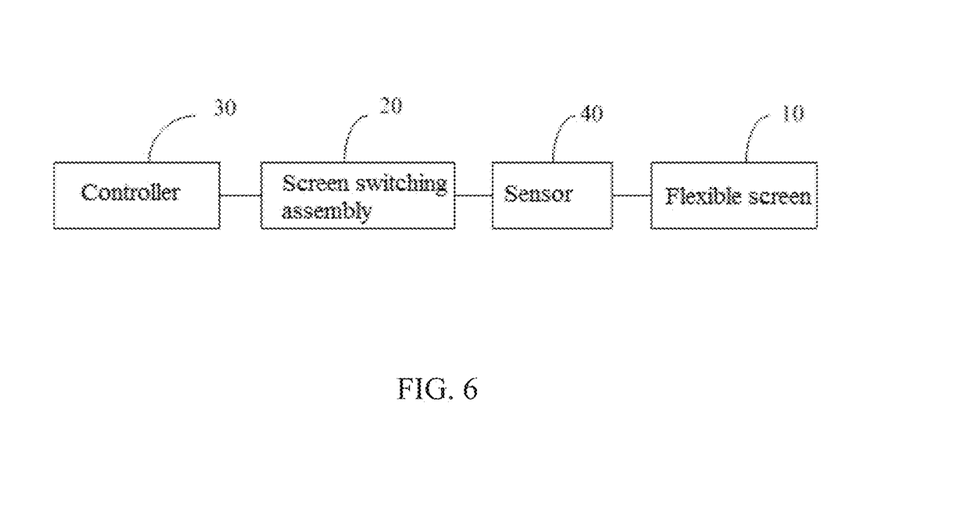
FIG. 6 is a schematic diagram of a locating assembly of the intelligent terminal illustrated in FIG. 1 according to another embodiment of the present disclosure.

Referring to FIG. 6, in a second embodiment of the present disclosure, the intelligent terminal may further include a sensor 40. The controller 30 is configured to determine the scenario in which the intelligent terminal is currently located according to sensing data of the sensor 40. The controller 30 is further configured to control the winding or releasing of the flexible screen 10 with the screen switching assembly 20 according to the scenario in which the intelligent terminal is currently located and a screen switching condition. As an implementation, the sensor 40 may be a location sensor, such as a Global Positioning System (GPS) location sensor, a Beidou location sensor, and the like. The location sensor can be configured to detect where the user is currently located.

In an implementation, the screen switching condition may include a correspondence relationship between scenarios and statuses of the flexible screen, which is preset by a user in the intelligent terminal. Specifically, the correspondence relationship between the scenarios and the statuses of the flexible screen, refers to a user-preset relationship between locations and an expanded status or a retracted status of the flexible screen 10. For example, the user can preset that the flexible screen 10 is in the retracted status in the office, and preset that the flexible screen 10 is in the expanded status on the way from home to office. When the user goes out, the location sensor determines location information of the user and transmits it to the controller 30. The controller 30 is configured to determine that the user has gone out according to the location information of the user, thereby automatically controlling the screen switching assembly 20 to expand the flexible screen 10. When the user arrives at the office, the screen switching assembly 20 is then controlled by the controller 30 to automatically retract the flexible screen 10 according to location information of the user. In this case, the controller 30 is configured to implement the above-identified method according to timings and statuses of the flexible screen that needs to be switched preset by the user in the system. In this manner, the user is capable of viewing videos via the expanded flexible screen 10 on the way from home to office and retracting the flexible screen 10 to avoid disturbing work after arriving at the office.

In another implementation, the screen switching condition may include a correspondence relationship, built in the intelligent terminal, between scenarios and statuses of the flexible screen. Specifically, the correspondence relationship preset by a user in the intelligent terminal between the scenarios and the statuses of the flexible screen, refers to a relationship preset in a system between times or locations and the expanded status or the retracted status of the flexible screen 10. In other words, there are some common judgment standards for switching the flexible screen built in the controller 30 rather than preset by the user. For example, when determining that the user is outdoors, the controller 30 controls the screen switching assembly 20 to automatically switch the flexible screen 10 into the expanded status according to location information of the user; when determining that the user is indoors, the controller 30 controls the screen switching assembly 20 to automatically switch the flexible screen 10 into the retracted status according to location information of the user. As another example, when determining that it is in the evening, the controller 30 controls the screen switching assembly 20 to automatically switch the flexible screen 10 into the expanded status; when determining that it is at the daytime, the controller 30 controls the screen switching assembly 20 to automatically switch the flexible screen 10 into the retracted status. As yet another example, when determining that the user is inside or outside a vehicle, the controller 30 controls the screen switching assembly 20 to automatically switch the flexible screen 10 into the expanded or retracted status according to location information of the user. Under the above screen switching condition, the sensor may further include a motion sensor other than the location sensor. The emotion sensor is configured to assist the location sensor in detecting, to more accurately determine a current status of the user. The motion sensor can be configured to determine at least one of speed, direction, temperature, altitude, and heart rate of the user, which can be cooperated with the location sensor to provide the controller 30 with an accurate current scenario of the intelligent terminal.

Different from the second embodiment, in a third embodiment of the present disclosure, the controller 30 is configured to control the winding or unwinding of the flexible screen 10 with the screen switching assembly 20 according to the scenario in which the intelligent terminal is currently located and the screen switching condition.

As an implementation, the screen switching condition may include one of a correspondence relationship between operation records of a user and statuses of the flexible screen 10, and a correspondence relationship between operation habits of the user and the statuses of the flexible screen 10. The operation records of the user may be determined according to previous operation habits of the user. For example, the user spends 80% of his/her times on the expanded flexible screen 10 on the way from home to office. In this case, when the user goes out, the controller 30 calls previous operation records of the user and obtains that the user spends 80% of his/her times on the expanded flexible screen 10 on the way from home to office, and then the controller 30 controls the screen switching assembly 20 to automatically expand the flexible screen 10.

A motion sensor can be configured to assist in detecting changes in a location in addition to the location sensor, to more accurately determine the current status of the user. For example, when the user goes out, the location sensor detects that a geographic location of the intelligent terminal has changed and the motion sensor detects a change in the speed of the intelligent terminal, and then the controller 30 determines that the user is in a commuting mode according to the current time and the speed of the change in the location. The controller 30 obtains that the flexible screen 10 has been used in the expanded status in eighty percent of the usage times by calling the previous operation records of the user in the current mode, and controls the screen switching assembly 20 to switch the flexible screen 10 into the expanded status. For another example, when the user enters the office, the location sensor detects the geographic location is changed again and then determines that the user is currently at an office location d then the controller 30 controls the screen switching assembly 20 to automatically retract the flexible screen 10 according to previous operation records of the user. Therefore, in addition to the location sensor for detecting location, the motion sensor can also be configured to assist in detecting, to more accurately determine the current status of the user.

In another implementation, the screen switching condition may include one of a correspondence relationship between operation records of other users and statuses of the flexible screen 10, and a correspondence relationship between operation habits of the other users and the statuses of the flexible screen 10. The operation records of the user may be determined according to previous operation habits of the other users. In particular, if the user may not have been to a certain place before, the controller 30 can automatically switch the flexible screen 10 into the expanded status or retracted status according to the common operation habits of the other users in this place. For example, if a user B goes to a country park that he/her has never been to, when the user B arrives at the park, the intelligent terminal detects a geographical location via the sensor and obtains the operation habits of the other users through the Internet. When determining that eighty percent of users in the park choose to operate the intelligent terminal with the expanded flexible screen 10, the screen switching assembly 20 is then controlled by the controller 30 to automatically switch the flexible screen 10 into the expanded status. In this process, the motion sensor can be used to determine at least one of speed, direction, temperature, altitude, and heart rate of the user, which can be cooperated with the location sensor to determine the current scenario of the intelligent terminal for the controller 30.

In one implementation, the controller 30 includes a determining module, which is configured to determine a priority of each of a plurality of screen switching conditions, and the controller 30 is configured to control the winding or unwinding of the flexible screen 10 with the screen switching assembly 20 according to the screen switching condition with the highest priority. The plurality of screen switching conditions include a screen switching condition preset by the user and a screen switching condition built in a system of the intelligent terminal, where the screen switching condition preset by the user has a priority higher than that of the screen switching condition built in the system.

The plurality of screen switching conditions further includes a screen switching condition associated with the operation records or the operation habits of the user, which has a priority lower than that of the screen switching condition preset by the user, and higher than that of the screen switching condition built in the system.

The plurality of screen switching conditions further include a screen switching condition associated with the operation records or the operation habits of the other users, which has a priority lower than that of the screen switching condition associated with the operation records or the operation habits of the user, and higher than that of the screen switching condition built in the system.

The determining module is configured to perform a determination according to a preset determining standard. If there exists multiple switching conditions at the same time, for example, when a condition preset by the user and a condition built in the system are satisfied at the same time, or when a condition of the operation records of the user and a condition of the operation records of the other users are satisfied at the same time, the determining module will determine which switching condition has a higher priority, and then execute the switching condition with the higher priority. In the present disclosure, the screen switching condition preset by the user has a priority higher than that of the switching condition associated with the operation records of the user, and/or the switching condition associated with the operation records of the user has a priority higher than that of the switching condition associated with the operation records of the other users, and/or the switching condition associated with the operation records of the other users has a priority higher than that of the preset switching condition built in the system.

In a fourth embodiment of the present disclosure, the sensor 40 may be a motion sensor, and the controller 30 is configured to determine the scenario in which the intelligent terminal is currently applied according to sensing data of the motion sensor. Different from the second embodiment of the disclosure, the controller 30 is configured to control the screen switching assembly 20 to expand or retract the flexible screen 10, according to a corresponding relationship between scenarios in which the intelligent terminal is currently applied and the statuses of the flexible screen 10. In other implementations, the motion sensor may be a speed sensor, a height sensor, a temperature sensor, a direction sensor, or the like. For example, when the height sensor detects that the user's altitude continues to increase, the controller 30 may determine that the user is in a process of climbing or flying. The controller 30 may control the flexible screen 10 to expand automatically, according to the corresponding relationship between altitude and the statuses of the flexible screen 10, and switch the intelligent terminal to a navigation mode or a flight mode.

In the embodiments of the intelligent terminal of the disclosure, the controller 30 is further configured to output screen switching prompt information used for determining whether switch the flexible screen 10, before the controller 30 controls the winding or unwinding of the flexible screen 10 with the screen switching assembly 20.

In an implementation, the controller 30 is further configured to control switching the winding or unwinding of the flexible screen 10, when no operation instruction is received within a preset period in which the screen switching prompt information is outputted. In another implementation, the controller 30 is further configured to stop switching the winding or unwinding of the flexible screen 10, when an operation instruction is received within the preset period in which the screen switching prompt information is outputted.

In some occasions, the user does not want to automatically switch a watch screen, for example, when the user wears a long-sleeved cloth to cover the watch, or when the user is in a formal occasion (such as during a speech). However, the user does not always remember to cancel or limit the automatic switching of the screen. In order to prevent the occurrence of embarrassing or even dangerous situations, the controller 30 may control the watch to output a prompt before an automatic switching of the screen. As an implementation, the manner for prompting may include a text prompt displayed on the screen, a sound from a speaker, and a vibration of a vibration motor built in the watch. Time required for prompting can be maintained for a while, and can be set as needed. When the prompt comes up, if the user does not do any response, the screen will be switched after the time has elapsed, and then the switching of the screen will be stopped if the user touches the screen or presses a switch on a side of the watch.

According to the intelligent terminal of the present disclosure, the controller is configured to control the winding or unwinding of the flexible screen with the screen switching assembly according to different current scenarios, such that the user can use different functions in different scenarios by switching the screen size appropriately, thereby facilitating the user's use.

Figure 8:
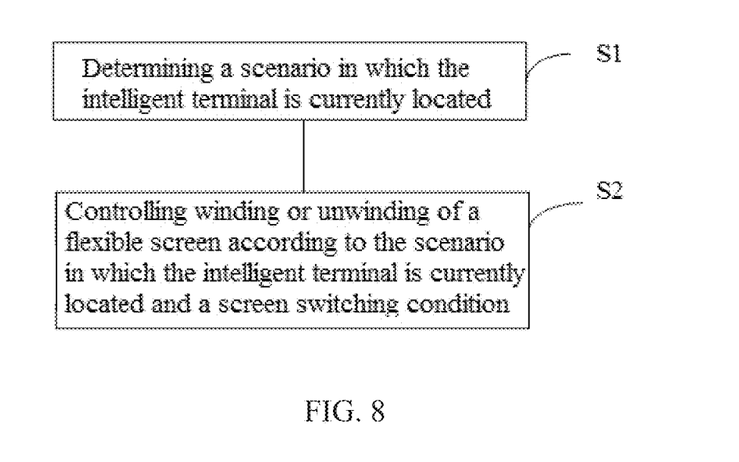
FIG. 8 is a flow chart of a method for controlling an intelligent terminal according to an embodiment of the present disclosure.

Referring to FIG. 8, a method for controlling an intelligent terminal is provided. The method begins at S1.

At S1, a scenario in which the intelligent terminal is currently located is determined.

At S2, winding or unwinding of a flexible screen is controlled according to the scenario in which the intelligent terminal is currently located and a screen switching condition.

In an embodiment of the present disclosure, the scenario in which the intelligent terminal is currently located is determined as follows. The scenario in which the intelligent terminal is currently located is determined according to sensing data of a location sensor, or sensing data of a location sensor and a motion sensor. In an implementation, the switching condition refers to a corresponding relationship between operation records of a user obtained in advance and statuses of the flexible screen.

As an implementation, controlling the winding or unwinding of the flexible screen according to the scenario in which the intelligent terminal is currently located and the screen switching condition includes the following. A screen switching condition preset by a user is obtained. The winding or unwinding of the flexible screen is controlled, according to the scenario in which the intelligent terminal is currently located and the screen switching condition preset by the user, when the screen switching condition preset by the user is obtained. A screen switching condition built in a system of the intelligent terminal continues to be obtained, when no screen switching condition preset by the user is obtained. The winding or unwinding of the flexible screen is controlled according to the scenario in which the intelligent terminal is currently located and the screen switching condition built in the system.

As another implementation, controlling the winding or unwinding of the flexible screen according to the scenario in which the intelligent terminal is currently located and the screen switching condition further includes the following. A screen switching condition associated with operation records or operation habits of other users is obtained, prior to obtaining the screen switching condition built in the system. When the screen switching condition associated with the operation records or the operation habits of the other users is obtained, the winding or unwinding of the flexible screen is controlled, according to the scenario in which the intelligent terminal is currently located and the screen switching condition associated with the operation records or the operation habits of the other users. Otherwise, when no screen switching condition associated with the operation records or the operation habits of the other users is obtained, the screen switching condition built in the system continues to be obtained, and the winding or unwinding of the flexible screen is controlled, according to the scenario in which the intelligent terminal is currently located and the screen switching condition built in the system.

As an implementation of the present disclosure, the screen switching condition includes one of a correspondence relationship between the operation records or the operation habits of the user and statuses of the flexible screen, and a correspondence relationship between the operation records or the operation habits of the other users and the statuses of the flexible screen.

Figure 9:
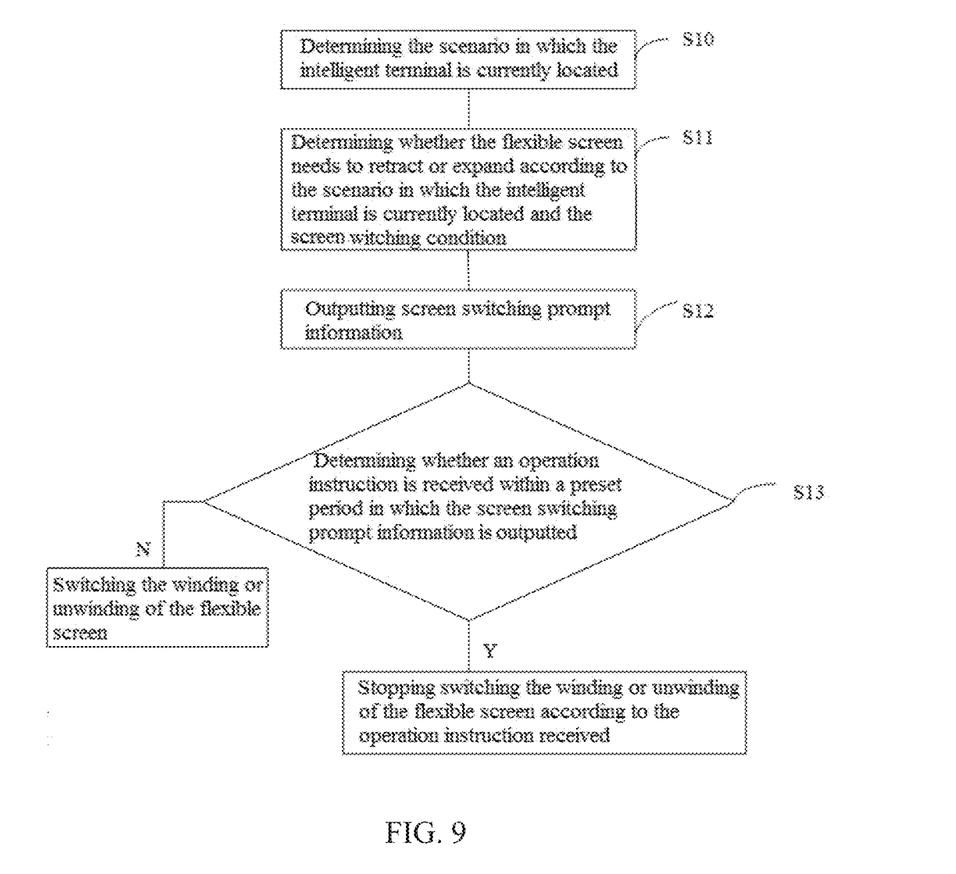
FIG. 9 is a flow chart of a method for controlling an intelligent terminal according to another embodiment of the present disclosure.

Referring to FIG. 9, in another embodiment of the present disclosure, controlling the winding or unwinding of the flexible screen according to the scenario in which the intelligent terminal is currently located and the screen switching condition includes the following. At S10, the scenario in which the intelligent terminal is currently located is determined. At S11, whether the flexible screen needs to retract or expand is determined, according to the scenario in which the intelligent terminal is currently located and the screen switching condition. Then the winding or unwinding of the flexible screen is controlled.

The method further includes the following prior to controlling the winding or unwinding of the flexible screen. At S12, screen switching prompt information is outputted. At S13, whether an operation instruction is received is determined, within a preset period in which the screen switching prompt information is outputted. When an operation instruction is received within the preset period, switching the winding or unwinding of the flexible screen is stopped. Otherwise, when no operation instruction is received within the preset period, the winding or unwinding of the flexible screen is controlled.

With aid of the method for controlling the intelligent terminal, the occasion where the user is located can be determined, and the smart watch can be controlled to automatically switch the size of the screen, thereby making the use process more intelligent.

While the present disclosure has been described in detail above with reference to the exemplary embodiments, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. An intelligent terminal, comprising:
a flexible screen;
a screen switching assembly; and
a controller, configured to control retracting or expanding of the flexible screen with the screen switching assembly according to a scenario in which the intelligent terminal is currently located; wherein, the controller is further configured to perform the following before the controller controls the retracting or expanding of the flexible screen with the screen switching assembly:
outputting screen switching prompt information configured to determine whether switch the flexible screen.

2. The intelligent terminal of claim 1, further comprising a sensor;
the controller being configured to determine the scenario in which the intelligent terminal is currently located according to sensing data of the sensor, and the controller being further configured to control the retracting or expanding of the flexible screen with the screen switching assembly according to the scenario in which the intelligent terminal is currently located and a screen switching condition.

3. The intelligent terminal of claim 2, wherein the screen switching condition comprises:
a correspondence relationship, preset by a user in the intelligent terminal, between scenarios and statuses of the flexible screen.

4. The intelligent terminal of claim 2, wherein the screen switching condition comprises:
a correspondence relationship, built in the intelligent terminal, between scenarios and statuses of the flexible screen.

5. The intelligent terminal of claim 2, wherein the screen switching condition comprises one of:
a correspondence relationship between operation records of a user and statuses of the flexible screen; and
a correspondence relationship between operation habits of the user and the statuses of the flexible screen.

6. The intelligent terminal of claim 2, wherein the screen switching condition comprises one of:
a correspondence relationship between operation records of other users and statuses of the flexible screen; and
a correspondence relationship between operation habits of the other users and the statuses of the flexible screen.

7. The intelligent terminal of claim 1, wherein the scenario in which the intelligent terminal is currently located comprises a system time of the intelligent terminal, and the controller is configured to control the retracting or expanding of the flexible screen with the screen switching assembly, according to the system time and a correspondence relationship between preset times and statuses of the flexible screen.

8. The intelligent terminal of claim 1, wherein the controller comprises a determining module, which is configured to determine a priority of each of a plurality of screen switching conditions, and the controller is configured to control the retracting or expanding of the flexible screen with the screen switching assembly according to the screen switching condition with the highest priority.

9. The intelligent terminal of claim 8, wherein the plurality of screen switching conditions comprise a screen switching condition preset by a user and a screen switching condition built in a system of the intelligent terminal, and the screen switching condition preset by the user has a priority higher than that of the screen switching condition built in the system.

10. The intelligent terminal of claim 9, wherein the plurality of screen switching conditions further comprise a screen switching condition associated with operation records or operation habits of the user, which has a priority lower than that of the screen switching condition preset by the user and higher than that of the screen switching condition built in the system.

11. The intelligent terminal of claim 10, wherein the plurality of screen switching conditions further comprise a screen switching condition associated with operation records or operation habits of other users, which has a priority lower than that of the screen switching condition associated with the operation records or the operation habits of the user and higher than that of the screen switching condition built in the system.

12. The intelligent terminal of claim 1, wherein the controller is further configured to switch the retracting or expanding of the flexible screen, when no operation instruction is received within a preset period in which the screen switching prompt information is outputted.

13. The intelligent terminal of claim 1, wherein the controller is further configured to stop switching the retracting or expanding of the flexible screen, when an operation instruction is received within a preset period in which the screen switching prompt information is outputted.

14. The intelligent terminal of claim 1, wherein the flexible screen comprises a flexible screen body, a first half casing, and a second half casing; wherein the first half casing is provided with a spool, and the flexible screen body has an end wound on the spool and has another end fixed to the second half casing; wherein the screen switching assembly comprises a motor and a rod, the motor is fixed with the first half casing, the rod has a tail end fixed with the second half casing, and the motor is configured to telescope to drive the rod to adjust a distance between the first half casing and the second half casing, to retract or expand the flexible screen body.

15. A method for controlling an intelligent terminal, comprising:
determining a scenario in which the intelligent terminal is currently located; and
controlling a flexible screen to retract or expand, according to the scenario in which the intelligent terminal is currently located and a screen switching condition; wherein, the method further comprises the following prior to the controlling the flexible screen to retract or expand:
outputting screen switching prompt information.

16. The method of claim 15, wherein the controlling a flexible screen to retract or expand according to the scenario in which the intelligent terminal is currently located and a screen switching condition, comprises:
obtaining a screen switching condition preset by a user;
controlling the flexible screen to retract or expand according to the scenario in which the intelligent terminal is currently located and the screen switching condition preset by the user, when the screen switching condition preset by the user is obtained; and continuing to obtain a screen switching condition built in a system of the intelligent terminal when no screen switching condition preset by the user is obtained, and controlling the flexible screen to retract or expand according to the scenario in which the intelligent terminal is currently located and the screen switching condition built in the system.

17. The method of claim 16, wherein the controlling a flexible screen to retract or expand according to the scenario in which the intelligent terminal is currently located and a screen switching condition, further comprises:

obtaining a screen switching condition associated with operation records or operation habits of other users prior to obtaining the screen switching condition built in the system, when no screen switching condition preset by the user is obtained;

controlling the flexible screen to retract or expand according to the scenario in which the intelligent terminal is currently located and the screen switching condition associated with the operation records or the operation habits of the other users, when the screen switching condition associated with the operation records or the operation habits of the other users is obtained; and continuing to obtain the screen switching condition built in the system when no screen switching condition associated with the operation records or the operation habits of the other users is obtained, and controlling the flexible screen to retract or expand according to the scenario in which the intelligent terminal is currently located and the screen switching condition built in the system.

18. The method of claim 15, wherein the controlling a flexible screen to retract or expand according to the scenario in which the intelligent terminal is currently located and a screen switching condition, comprises:

determining whether the flexible screen needs to retract or expand according to the scenario in which the intelligent terminal is currently located and the screen switching condition; and controlling the flexible screen to retract or expand.

19. The method of claim 18, comprising:

determining whether an operation instruction is received within a preset period in which the screen switching prompt information is outputted;

stopping switching the retracting or expanding of the flexible screen, when an operation instruction is received within the preset period; and switching the retracting or expanding of the flexible screen, when no operation instruction is received within the preset period.

\* \* \* \* \*